United States Patent [19]

Mitsuhashi

[11] Patent Number: 5,311,377
[45] Date of Patent: May 10, 1994

[54] DRIVER DEVICE OF MAGNETIC HEADS FOR MAGNETIC RECORD AND REPRODUCTION

[75] Inventor: Yasuo Mitsuhashi, Nagaokakyo, Japan

[73] Assignee: Mitsubishi Denki Kabushiki Kaisha, Tokyo, Japan

[21] Appl. No.: 733,843

[22] Filed: Jul. 22, 1991

[30] Foreign Application Priority Data

Jul. 23, 1990 [JP] Japan .................... 2-197484

[51] Int. Cl.⁵ .................... G11B 15/12; G11B 5/03; G11B 5/02
[52] U.S. Cl. .................... 360/61; 360/64; 360/66; 360/68
[58] Field of Search .................... 360/10.3, 66, 61, 64, 360/68

[56] References Cited

U.S. PATENT DOCUMENTS

| 3,813,693 | 5/1974 | Gooch et al. ............ 360/119 |
| 4,302,790 | 11/1981 | Lemke .................... 360/119 |
| 4,520,405 | 5/1985 | Sasaki et al. ............ 360/66 |
| 4,635,137 | 1/1987 | Matsumoto et al. ........ 360/10.3 |
| 4,827,359 | 5/1989 | Ookawa et al. ........... 360/10.3 |
| 4,858,029 | 8/1989 | Ookawa .................. 360/10.3 |
| 5,063,452 | 11/1991 | Higurashi ............... 360/66 |

FOREIGN PATENT DOCUMENTS

| 0427008 | 5/1991 | European Pat. Off. . |
| 60-13303 | 1/1985 | Japan . |
| 60-242501 | 12/1985 | Japan . |
| 61-90306 | 5/1986 | Japan . |
| 61-90307 | 5/1986 | Japan . |
| 63-74101 | 4/1988 | Japan . |

Primary Examiner—William L. Sikes
Assistant Examiner—Trong Phan

[57] ABSTRACT

A driver device for magnetic heads for a magnetic recording and reproduction apparatus. The driver device drives at least one combined head including at least two head members, each head member having a winding coil, and the effective gap width of the combined head is changed by selectively short-circuiting at least one of the winding coils. By switching a connection between the combined head and a record amplifier or a reproduction head amplifier, the effective gap width of the combined head is changed either to a narrow effective gap width for n time speed recording or reproducing or to a wide effective gap width for standard speed recording or reproducing.

6 Claims, 6 Drawing Sheets

DRIVER DEVICE OF MAGNETIC HEADS FOR MAGNETIC RECORD AND REPRODUCTION

BACKGROUND OF THE INVENTION

1. Field of the Invention

The present invention relates to a driver device of magnetic heads for use in a magnetic record and reproduction apparatus such as a video tape recorder (VTR) or the like.

2. Description of the Background

Figure 5:
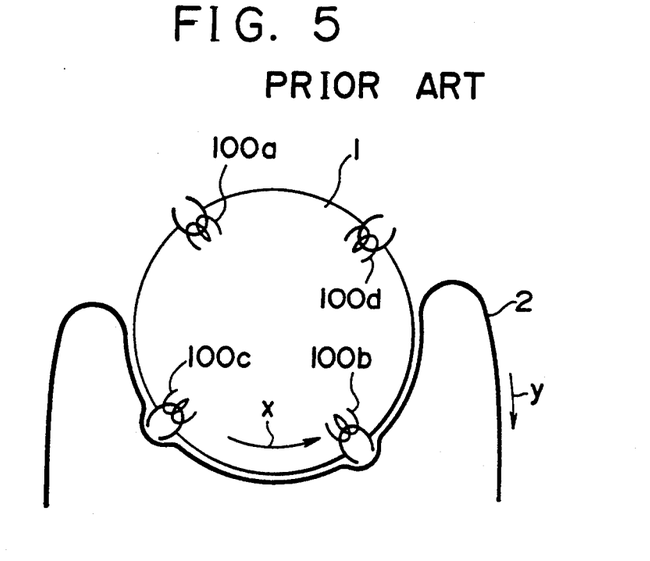
FIG. 5 is an elevational view of a rotary drum of an independent 4 head type for use in a conventional VTR.

In FIG. 5, there is shown a rotary drum of an independent 4 head type for use in a conventional video tape recorder (VTR). A rotary drum 1 is rotated at a speed of 1800 r.p.m. in a direction shown by an arrow X, and a magnetic tape 2, a recording medium having a thickness of 19 $\mu$m is wound around approximately half the rotary drum 1 and runs at a speed of 3.335 cm/sec in a direction indicated by an arrow y in the VHS system. The rotary drum 1 is provided with four rotary video heads 100a, 100b, 100c and 100d having an azimuth angle of +6° or −6° on its periphery. The two heads 100a and 100b having a track width of 58 $\mu$m for covering a standard mode are correctly arranged in opposite positions on the rotary drum 1, and the two heads 100c and 100d having a track width of 19 $\mu$m for covering a triple speed mode are arranged on the rotary drum 1 in the same manner as the heads 100a and 100b.

Figure 6:
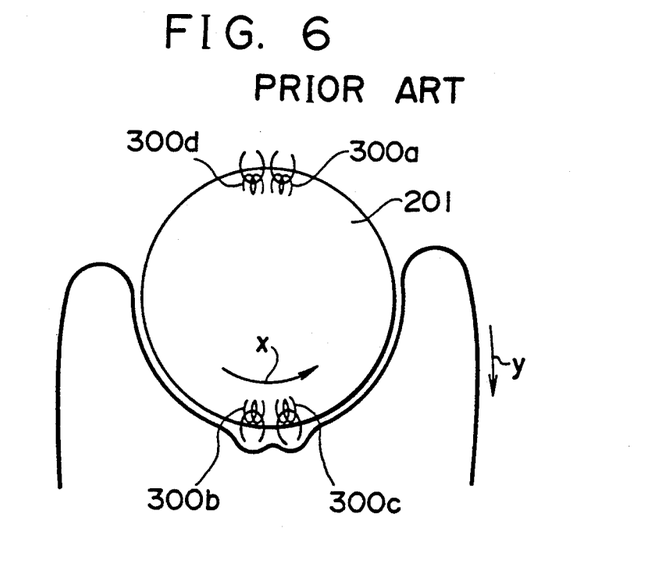
FIG. 6 is an elevational view of a rotary drum of another combined 4 head type for use in a conventional VTR.
Figure 7:
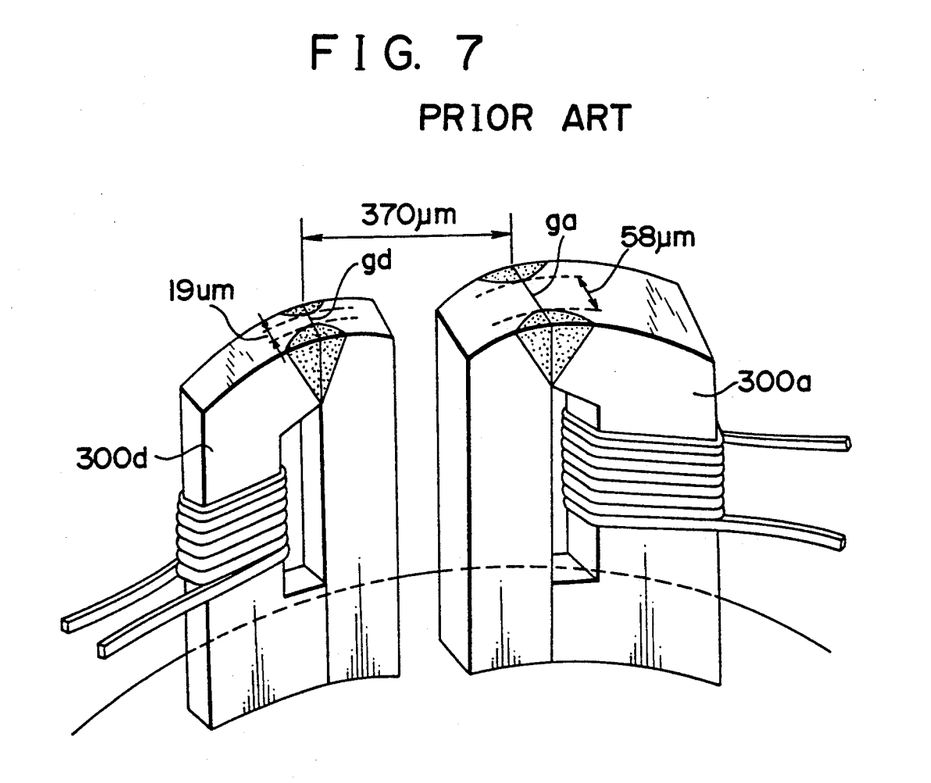
FIG. 7 is an enlarged perspective view of combined heads shown in FIG. 6.

In FIGS. 6 and 7, there is shown another rotary drum of a combined 4 head type for use in a conventional VTR. In this case, as shown in FIG. 7, a head 300a having a track width of 58 $\mu$m for standard mode record and reproduction and a head 300d having a track width of 19 $\mu$m for triple speed mode record and reproduction are mounted on a head base 201 at a distance of 1 H, i.e., 370 $\mu$m to constitute combined heads. Heads 300b and 300c constitute combined heads in the same manner as the heads 300a and 300d. Two pairs of combined heads 300a, 300d, 300b and 300c are arranged in opposite positions on a rotary drum 201 as shown in FIG. 6.

In the conventional rotary drum of the independent or combined 4 head type shown in FIG. 5 or 6, in the standard mode record and reproduction, heads 100a and 100b or 300a and 300b are operated, while the heads 100c and 100d or 300c and 300d are just idled in an inoperative state. In the triple speed mode record and reproduction, the heads 100c and 100d or 300c and 300d are operated, while the heads 100a and 100b or 300a and 300b are in the inoperative state. In the conventional rotary drum of the combined 4 head type, since the azimuth angle of the heads 300a and 300c is determined to an equal angle ±6° and the azimuth angle of the heads 300b and 300d is determined to an equal angle −6°, in a still image reproduction, when the tape is stopped, the image can be reproduced by using the two heads 300a and 300c. That is, since one recorded video track is reproduced by the two heads having the same azimuth angle (+6°) and different head widths (the head 300a=58 $\mu$m and the head 300c=19 $\mu$m), a clear still image can be readily reproduced without blurring. As a result, the rotary drum of the combined 4 head type is widely used for a public VTR.

Figure 4:
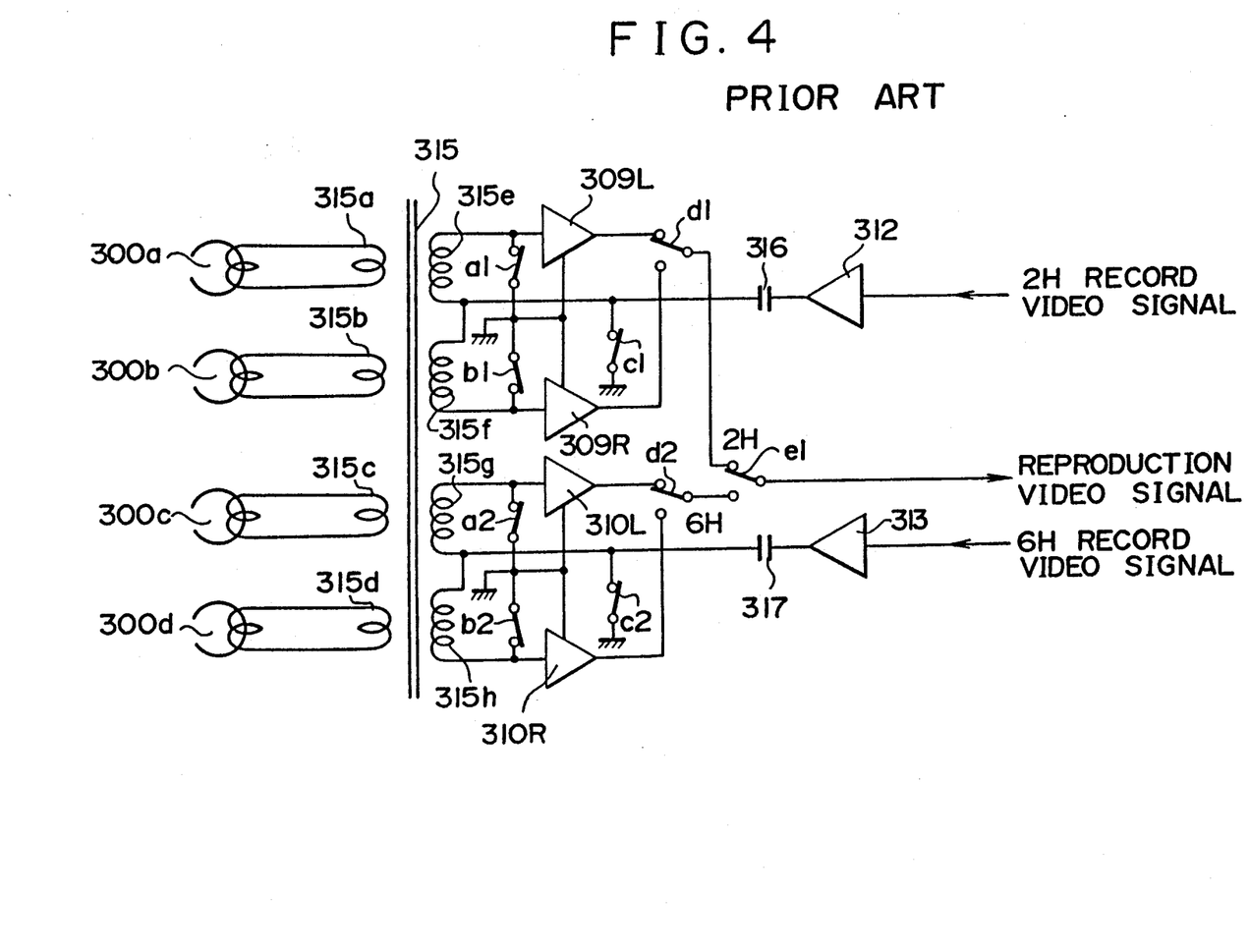
FIG. 4 is a circuit diagram of a conventional driver circuit for a rotary drum of an independent 4 head type used in a conventional VTR.

In FIG. 4, there is shown a driver circuit for the video heads 300a, 300b, 300c and 300d shown in FIG. 6. A rotary transformer 315 includes four primary coils 315a, 315b, 315c and 315d and four secondary coils 315e, 315f, 315g and 315h corresponding to the respective primary coils 315a, 315b, 315c and 315d. The two video heads 300a and 300b for the standard mode are connected to the two primary coils 315a and 315b, respectively, while the two video heads 300c and 300d for the triple speed mode are connected to the two primary coils 315c and 315d, respectively. A pair of reproduction head amplifiers 309L and 309R corresponding to the respective video heads 300a and 300b are connected to one end of the secondary coils 315e and 315f, respectively. A record amplifier 312 is coupled to the other ends of the secondary coils 315e and 315f through a capacitor 316. A 2 H (2 hour) record video signal is applied to the record amplifier 312 in a 2 hour standard mode recording. A pair of reproduction head amplifiers 310L and 310R corresponding to the respective video heads 300c and 300d are connected to one end of the secondary coils 315g and 315h, respectively. Another record amplifier 313 is coupled to the other ends of the secondary coils 315g and 315h through another capacitor 317. A −6 H (6 hour) record video signal is applied to the record amplifier 313 in a 6 hour triple speed mode recording.

A pair of switches a1 and b1 are connected between the ends of the respective secondary coils 315e and 315f and ground, and a switch c1 is connected between the other ends of the secondary coils 315e and 315f and ground. A pair of switches a2 and b2 are connected between the end of the respective secondary coils 315g and 315h and ground, and a switch c2 is connected between the other ends of the secondary coils 315g and 315h and ground.

A switch d1 selects one output of the reproduction head amplifiers 309L and 309R, and a switch d2 selects one output of the reproduction head amplifiers 310L and 310R. A switch e1 selects one of 2 H and 6 H terminals connecting common terminals of the switches d1 and d2, that is, one output of the switches d1 and d2. A reproduction video signal is output from a common terminal of the switch e1.

Now, the operation of the driver circuit shown in FIG. 4 will be described in detail.

In the standard (2 hour or 2 H) mode recording, the switches a1 and b1 are closed and the switch c1 is open. The 2 H record video signal is recorded on a magnetic tape through the record amplifier 312, the rotary transformer 315 and the video head 300a or 300b. In the standard mode reproducing, the switches a1 and b1 are open and the switch c1 is closed. The switch d1 is turned over every field, and the switch e1 selects the 2 H terminal. The reproduction video signal picked up by the video head 300a or 300b is output through the rotary transformer 315, the reproduction head amplifier 309L or 309R and the switches d1 and e1.

On the other hand, in the triple speed (6 hour or 6 H) mode recording, the switches a2 and b2 are closed and the switch c2 is open. The 6 H record video signal is recorded on the magnetic tape through the record amplifier 313, the rotary transformer 315 and the video head 300c or 300d. In the triple speed mode reproducing, the switches a2 and b2 are open and the switch c2 is closed. The switch d2 is turned over every field, and the switch e1 selects the 6 H terminal. The reproduction video signal picked up by the video head 300c or 300d is output through the rotary transformer 315, the reproduction head amplifier 310L or 310R and the switches d2 and e1.

With the conventional magnetic heads for the magnetic record and reproduction and the driver device therefore, as described above, the tape running speed is changed depending on the standard and triple speed modes, and the track width is also changed depending on the standard and triple speed modes. Hence, the heads having the suitable different track widths are required for the standard and triple speed modes.

Further, as shown in FIGS. 5 and 6, taking note of the half periphery of the rotary drum on which the magnetic tape is loaded, when the head 100b or 300b for the standard mode is actuated, the unoperated head 100c or 300c for the triple speed mode contacts the magnetic tape. Since the head generally projects 40 μm from the outer peripheral surface of the rotary drum, when the head contacts the magnetic tape, the head beats on the magnetic tape to give vibrations to the magnetic tape and to cause the vibrations in the directions of X-, Y- and Z-axes. The vibration in the tape running direction (X-axis) causes the signals on the magnetized magnetic tape to carry out a speed modulation which causes a strong jitter phenomenon and brings about jitters in the reproducted image.

Consequently, even through it is unavoidable that the operated head beats the magnetic tape, the unoperated head 100c or 300c beats the magnetic tape at a different portion to cause the vibrations, and as an inevitable result, the vibrations are transmitted to another head 200b or 300b via the magnetic tape.

In the conventional combined 4 head type, as shown in FIG. 7, since two heads are combined on one block, the beating by the adjacent head of one block largely affects the other head. Further, in order to uniformly and stably contact the magnetic tape to the gap portions ga and gd of the combined heads, a high accuracy of curvature of the tape sliding surfaces of the heads and head mounting positions on the rotary drum are required, which are difficult to accomplish. Hence, problems at the contact surface between the head and the magnetic tape constantly arise, and the surfaces of the combined heads are frequently stuffed and smudged compared with a single head.

Furthermore, as shown in FIG. 4, since the pairs of heads are each independently switched over depending on not only the standard and triple speed modes but also the record and reproduction modes, the structure of the drive circuit for the heads becomes complicated. Further, in the reproduction mode, since slight reproduction signals are transmitted through the rotary transformer 315 and various switching operations are carried out, it is difficult to remove the noise, and in order to improve the signal-to-noise ratio (S/N) of the reproduction signal, there are many limits imposed on the shielding and the ground point. Further, in the combined 4 head type, as shown in FIG. 7, accurate realization of the gap of 370 μm between the combined heads as mounted brings about a manufacturing cost increase.

SUMMARY OF THE INVENTION

Accordingly, it is an object of the present invention to provide a driver device of a magnetic head for use in magnetic record and apparatus, free from the aforementioned defects and disadvantages of the conventional systems which is capable of preventing problems at the contact surface between the head and the magnetic tape, removing jitters, improving the signal-to-noise ratio of the reproduction signal, improving adjacent crosstalk, reducing the manufacturing cost and simplifying the construction of the head driving circuit.

In accordance with one aspect of the present invention, there is provided a driver device for at least one magnetic combined head mounted on a peripheral surface of a rotary drum, the combined head having an effective gap width and including at least two winding coils for head members for magnetic recording and reproduction, including a switch element, connected to the winding coils, for changing the effective gap width by selectively short-circuiting at least one of the winding coils so that the effective gap width of the combined head is changed to either a first effective gap width for an n (n is pin integer of at least 2) time speed mode when opened or a second effective gap width for a standard speed mode when opened, and a controller for either closing the switch element during n time speed mode, recording and reproducing or opening the switch element during standard speed mode recording and reproducing.

In a preferred embodiment of the driver device, a second switch element includes at least two switches having first and second connection states for selecting either the recording mode when the switches take the first connection state to supply a record video signal to the combined head or the reproducing mode when the switches take the second connection state to pick up a reproduction video signal from the combined head. Further, the controller controls whether the switches take either the first connection state during the recording mode or the second connection state during the reproducing mode.

The driver device can further include a video record amplifier arranged outside the rotary drum for amplifying a record video signal; a record amplifier arranged to rotate together with the rotary drum for further amplifying the record video signal amplified by the video record amplifier to output an amplified record video signal to the combined head; a reproduction head amplifier arranged to rotate together with the rotary drum for amplifying a reproduction video signal picked up by the combined head; a reproduction signal amplifier arranged outside the rotary drum for further amplifying the reproduction video signal amplified by the reproduction head amplifier to output an amplified reproduction video signal; and a rotary transformer for electrically connecting either the record amplifier with the video record amplifier, when recording, or the reproduction head amplifier with the reproduction signal amplifier, when reproducing, while the rotary drum is rotated.

In the driver device, preferably, the second switch element includes a first switch arranged outside the rotary drum and interposed between ground and a connection point of the video record amplifier with the rotary transformer; a second switch arranged outside the rotary drum and interposed between ground and a connection point of the reproduction signal amplifier with the rotary transformer; a third switch arranged so as to rotate together with the rotary drum and interposed between the record amplifier and a connection point of the reproduction head amplifier with the rotary transformer; and a fourth switch arranged so as to rotate together with the rotary drum for changing a connection either between ground and a connection point of the reproduction head amplifier with the combined head or between ground and a connection point of the record amplifier with the combined head.

The controller further controls the second switch element so that either the first switch is open, the second and third switches are closed, and the fourth switch connects between ground and the connection point of the reproduction head amplifier with the combined head when in the recording mode, or so that the first switch is closed, the second and third switches are open, and the fourth switch connects between ground and the connection point of the record amplifier with the combined head when in the reproducing mode.

In accordance with another aspect of the present invention, there is provided a driver device for at least two magnetic combined heads mounted on a peripheral surface of a rotary drum, each combined head having an effective gap width and including at least two winding coils for head members for the magnetic recording and reproduction, comprising at least two switch elements for the two combined heads, each switch elements being connected to the winding coils of each combined head, for changing the effective gap width of each combined head by selectively short-circuiting at least one of the winding coils of each combined head so that the effective gap width of each combined head is changed to either a first effective gap width for an n (n is an integer of at least 2) time speed mode when closed or a second effective gap width for a standard speed mode when opened, and a controller for either closing the two switch elements during in the n time speed mode recording and reproducing or opening the two switch elements during the standard speed mode recording and reproducing.

Further scope applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The above and other objects, features and advantages of the present invention will be more fully understood from the following description of the preferred embodiments with reference to the accompanying drawings which are given by way of illustration only and thus are not limitative and in which.

DESCRIPTION OF THE PREFERRED EMBODIMENT

Figure 1:
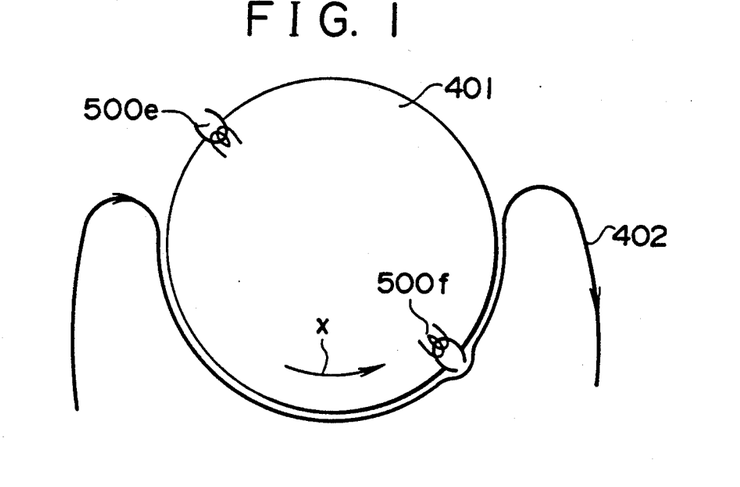
FIG. 1 is an elevational view of a rotary drum provided with combined heads for magnetic recording and reproduction, driven by a driver device according to the present invention.

Referring now to the drawings, wherein like reference characters designate like or corresponding parts throughout the several views and thus repeated description thereof can be omitted for brevity, there is shown in FIG. 1 a rotary drum 401 provided with a pair of combined heads 500e and 500f on opposite sides of its periphery for magnetic recording and reproduction, the combined heads 500e and 500f being controlled by a driver device according to the present invention. A magnetic tape 402 as a recording medium is loaded around approximately half the rotary drum 401, and standard mode recording and reproduction and triple speed mode recording and reproduction are carried out by using the combined heads 500e and 500f.

Figure 2:
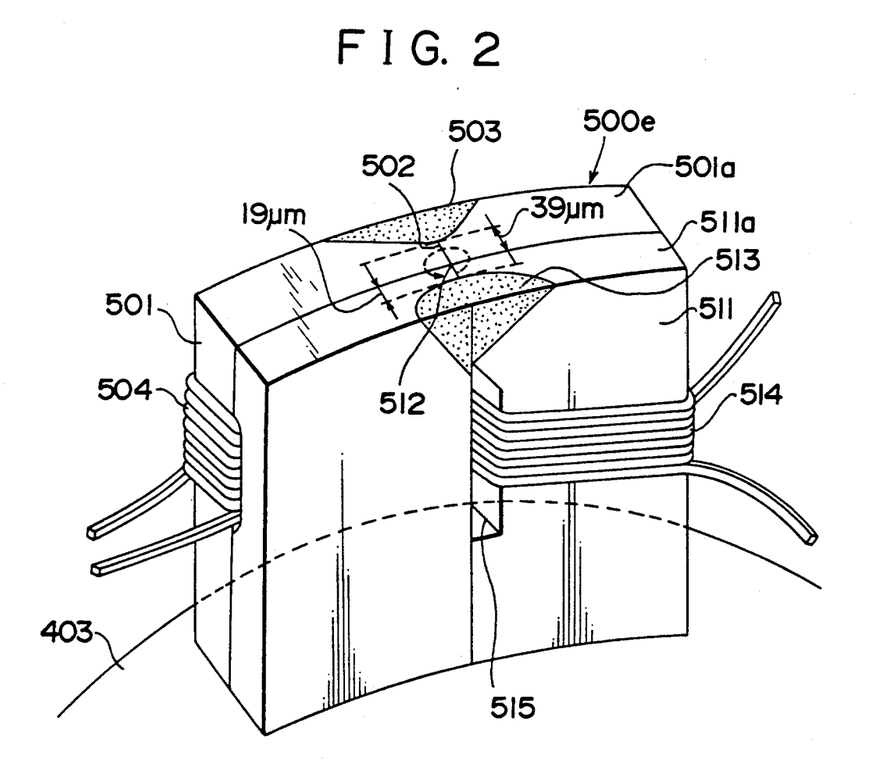
FIG. 2 is an enlarged perspective view of the combined head shown in FIG. 1.
Figure 3:
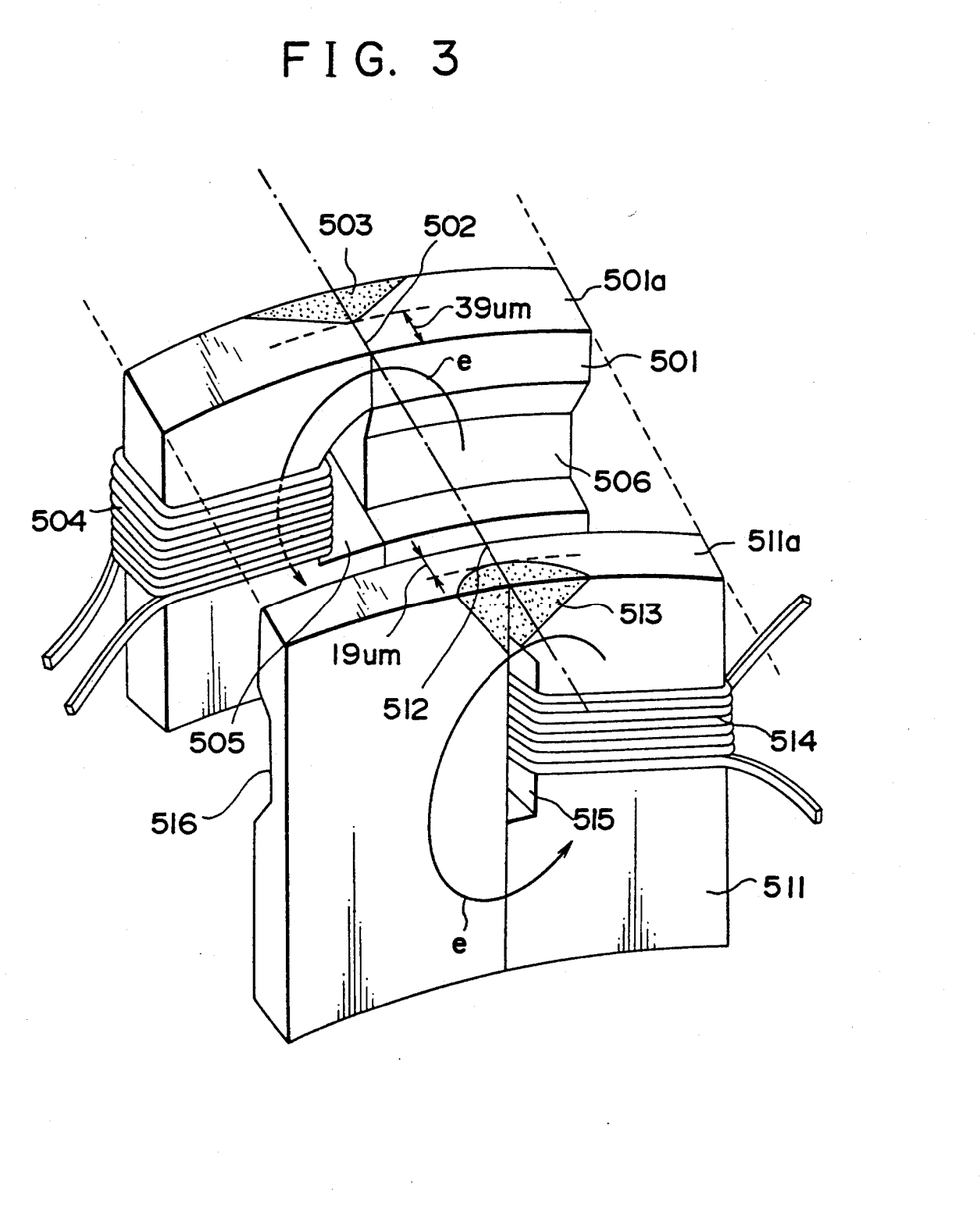
FIG. 3 is an exploded view of FIG. 2.

In FIGS. 2 and 3, there is shown the combined head 500e having the same structure as the combined head 500f. In the drawings, the combined head 500e includes two head chips 501 and 511 composed of ferrite single crystal. The head chips 501 and 511 possess sliding surfaces 501a and 511a, respectively, to be contacted with the magnetic tape 402, having head gap portions 502 and 512, respectively, for directly carrying out the recording and reproduction onto or off the magnetic tape 402. The widths of the head gap portions 502 and 512 are 39 $\mu$m and 19 $\mu$m, respectively. Numerals 503 and 513 denote respective glass reinforcement portions composed of a kind of adhesive for reinforcing the junctions of the head gap portions 502 and 512. The head chips 501 and 511 are formed with window portions 505 and 515, respectively, through which respective coils 504 and 514 wound around the respective chips 501 and 511 pass. The head chips 501 and 511 are also formed with hollow portions 506 and 516, respectively, on alternate sides of their contact surfaces for preventing the respective coils 514 and 504 wound around the other head chips 511 and 501 from contacting to the respective head chips 501 and 511. The head chips 501 and 511 are secured to a head base 403 generally made of brass.

Then, the above-described two head chips 501 and 511 are put together so that the head gap portions 502 and 512 may be correctly aligned in their width direction, as shown in FIG. 3, and are then integrally adhered to each other. In this case, the thickness of the adhesive layer at the sliding surface is several $\mu$m, and, assuming that this several $\mu$m is $a\mu$m, the exact gap width of the head gap 502 becomes $(39-a)$ $\mu$m. However, in order to simplify the explanation, the description will be made by considering $a$ as 0. The coils 504 and 514 are fitted in the respective hollow portions 516 and 506 and are strongly adhered.

As shown in FIG. 2, each combined head 500e or 500f is provided with a head gap width of 39 $\mu$m of one head chip 501 and a head gap width of 19 $\mu$m of the other head chip 511, that is, a total head gap width of 58 $\mu$m.

Although the thickness $a$ $\mu$m of the adhesive layer is ignored in the above description, actually, the width of the head gap portion 502 is determined to $(39-a)$ $\mu$m counting on the thickness of the adhesive layer. When adhesive glass is used for the reinforcement portions 503 and 513 are used in view of the manufacturing, the thickness of the adhesive layer is several $\mu$m, and the width of the head gap portions 502 or 512 may be determined as $\{58-(19$ or $39)-$several$\}$ $\mu$m.

Further, in this instance, the curvatures of the sliding surfaces 501a and 511a of the head chips 501 and 511 are preferably equal, and this can be achieved by rubbing by means of a polishing tape to make uniform the curvatures after the two head chips 501 and 511 are adhered.

Then, the obtained combined heads 500e and 500f are correctly mounted onto the rotary drum 401 so that the combined heads may project 40 μm from the peripheral surface of the rotary drum 401 and be arranged in opposite positions at an exact angle of 180° around the center of the rotary drum 401. The magnetic tape 402 is loaded around approximately half the rotary drum 401, as shown in FIG. 1.

In the standard mode recording or reproducing, since the gap width of (39 μm + 19 μm) of the combined heads 500e and 500f is used, both the head chips 501 and 511 are actuated. That is, the two coils 504 and 514 are connected by a switch so that the winding directions of the two coils 504 and 514 are the same so as to add the magnetic flux circulating through the head chips 501 and 511 to actuate the combined head as a head having a gap width equivalent to 58 μm.

In the triple speed mode recording or reproducing, only the head chip 511 is actuated so as to use the combined head as a head having a gap width of 19 μm. In this case, the coil 504 of the head chip 501 having a head gap of 39 μm is short-circuited in the rotary drum 401 to short-circuit the reproduction signal picked up by the head chip 501. At this time, the head gap portion 512 of the head chip 511 is actuated, and it is considered that the magnetic path of the head gap portion 512 is leaked to the adjacent head gap portion 502 having the gap width of 39 μm, as indicated by a broken arrow in FIG. 2. However, since the coil 504 for the head gap width of 39 μm is directly short-circuited, hardly any leakage occurs. Hence, the combined head is actuated as a head having the gap width of exactly 19 μm.

Figure 8:
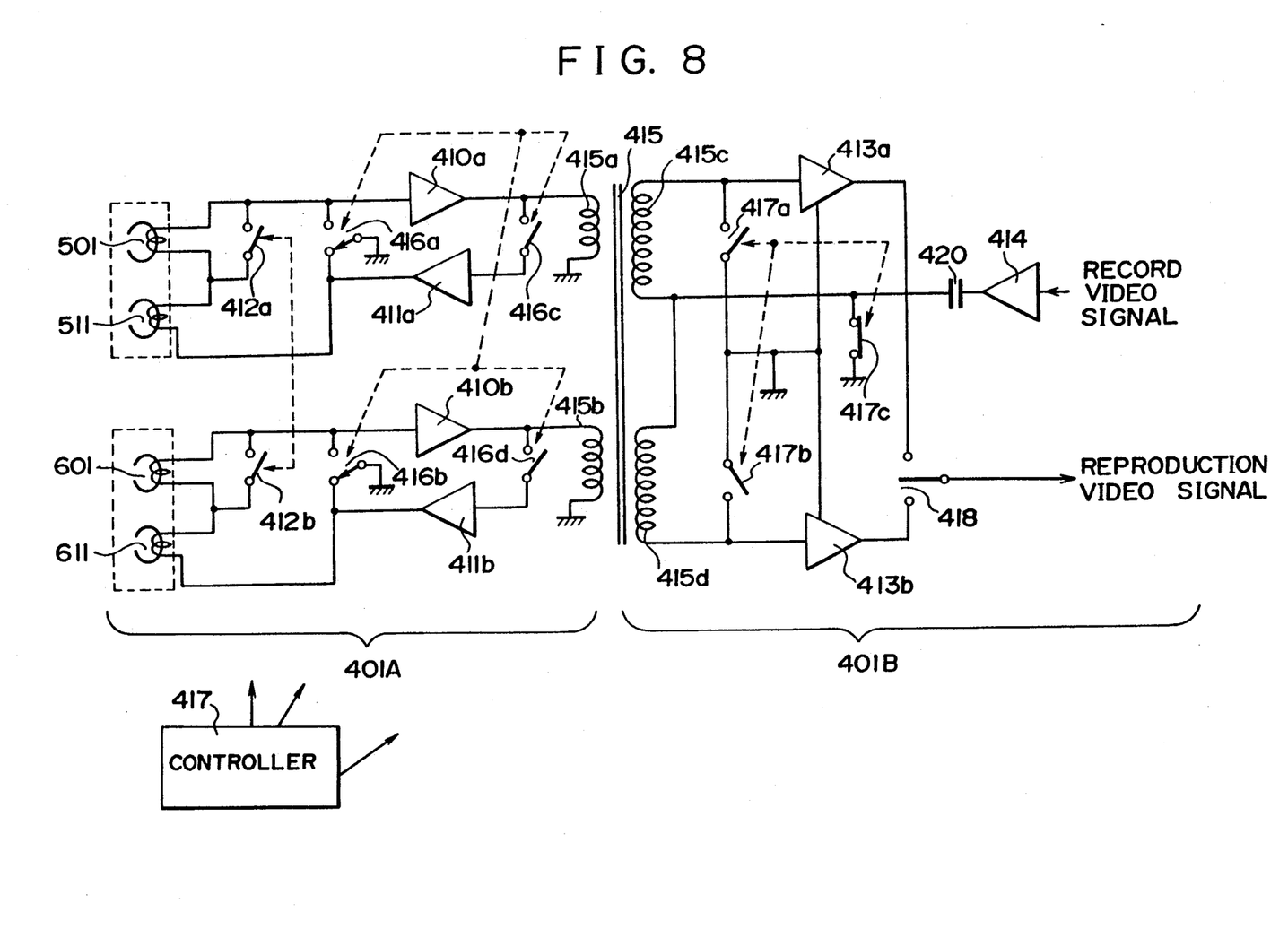
FIG. 8 is a circuit diagram of a driver device of combined heads for magnetic recording and reproduction according to the present invention.

In FIG. 8, there is shown a driver device, or more specifically a driver circuit for the combined heads shown in FIGS. 1 to 3 for magnetic recording and reproduction according to the present invention. In this embodiment, one combined head 500e comprises two head members 501 and 511 having an azimuth angle of +6° and the other combined head 500f comprises two head members 601 and 611 having an azimuth angle of −6°. A rotary transformer 415 includes two primary coils 415a and 415b and two secondary coils 415c and 415d. A pair of reproduction head amplifiers 410a and 410b, arranged within the rotary drum 410, are connected between one terminal of the respective head members 501 and 601 and one end of the respective primary coils 415a and 415b of the rotary transformer 415. A pair of record amplifiers 411a and 411b, arranged within the rotary drum 410, are connected between one terminal of the respective head members 511 and 611 and one end of the respective primary coils 415a and 415b through respective electronic switches 416c and 416d.

The other ends of the primary coils 415a and 415b are connected to ground. One of the terminals of either one of the head members 501 or 511 is selectively linked to ground by an electronic switch 416a, and either one of the terminals of either one of the head members 601 or 611 is selectively linked to ground by an electronic switch 416b. The electronic switches 416a, 416b, 416c and 416d constitute linked switches, as hereinafter described in detail. The other terminals of the head members 501 and 511 are coupled together, and the other terminals of the head members 601 and 611 are coupled together. An electronic switch 412a is interposed between one terminal of the head member 501 and the other terminals of the head members 501 and 511, and another electronic switch 412b is interposed between one terminal of the head member 601 and the other terminals of the head members 601 and 611. The two electronic switches 412a and 412b constitute linked switches for selectively short-circuiting the respective winding coils 504 and 514 of the respective head members 501 and 601 so as to change the head gap width to 58 μm (open) or 19 μm (closed) corresponding to the standard or triple speed mode.

A pair of reproduction signal amplifiers 413a and 413b are connected to one end of the respective secondary coils 415c and 415d. An FM video record amplifier 414 is connected to the other ends of the secondary coils 415c and 415d through a capacitor 420. A record video signal is supplied to the FM video record amplifier 414. A pair of switches 417a and 417b are connected between one end of each of the respective secondary coils 415c and 415d and ground, and a switch 417c is connected between the other ends of the secondary coils 415c and 415d and ground. The switches 417a, 417b and 417c constitute linked switches, as hereinafter described in detail. A switch 418 selects one output of the reproduction signal amplifiers 413a and 413b, and a reproduction video signal is output from a common terminal of the switch 418. A numeral 401A designates the circuit components within the rotary drum 401, and a numeral 401B denotes the circuit components outside the rotary drum 401 (in a fixed drum portion). A controller 417 controls the switches depending on the standard and triple speed modes and the record and reproduction modes to be selected by an operator.

The operation of the driver circuit shown in FIG. 8 will now be described in detail.

In the triple speed recording, the switches 412a and 412b are closed to short-circuit the head members 501 and 601 having the gap width of 39 μm. The switches 416a and 416b are turned over to directly connect one terminal of each of the head members 501 and 601 to ground, effectively bringing both terminals of each of the head members 501 and 601 and one terminal of each of the head members 511 and 611 to ground through switch 412a and 412b. The switches 416c and 416d are closed at this time. Simultaneously, the switches 417a and 417b are closed, but the switch 417c is open. The record video signal amplified in the record signal amplifier 414 drives the record amplifiers 411a and 411b through the rotary transformer 415 to actuate the head members 511 and 611 having the gap width of 19 μm, and the head members 511 and 611 record the video signal onto the magnetic tape 402. Since the head members 501 and 601 having the gap width of 39 μm are short-circuited, no record signal is applied to the same, and, since the short-circuited head members 501 and 601 have a large reluctance, the leaking magnetic flux of the head members 511 and 611 can not drive the head members 501 and 601.

Then, in the triple speed reproduction, the switches 412a and 412b are still closed. The switches 416a and 416b are turned over to connect one terminal of each of the head members 511 and 611 to ground, and the switches 416c and 416d are open at the same time. Further, the switches 417a and 417b are simultaneously open, and the switch 417c is closed. The respective slight reproduction video signals picked up from the magnetic tape 402 by the respective head members 511 and 611 pass through the respective switches 412a and 412b and are amplified in the respective reproduction head amplifiers 410a and 410b. Then, the respective amplified reproduction video signals are fed to the respective reproduction signal amplifiers 413a and 413b via the rotary transformer 415 and are amplified again in the reproduction signal amplifiers 413a and 413b. The amplified reproduction video signals output from the respective reproduction signal amplifiers 413a and 413b are switched every field by the switch 418, and frame video signals having a certain continuous level are output from the common terminal of the switch 418.

In this mode, since the head members 501 and 601 are short-circuited, the reproduction video signals picked up by the head members 501 and 601 are not applied to the rotary transformer 415. Since the short-circuited head members 501 and 601 have a large reluctance, the leaking magnetic flux of the reproduction FM video signals from the head members 501 and 601 to the head members 511 and 611 can be almost ignored.

Next, in the standard speed recording, the switches 412a and 412b are open. The switches 416a and 416b are turned over to connect one terminal of each of the head members 501 and 601 to ground, and the switches 416c and 416d are closed at the same time. Simultaneously, the switches 417a and 417b are closed, but the switch 417c is open. In this mode, the operation is carried out in the same manner as the triple speed recording described above. For example, as readily apparent, the record video signal amplified by the record signal amplifier 414 drives the record amplifiers 411a and 411b through the rotary transformer 415 to actuate the head members 501, 511 and 601, 611 to record the video signal onto the magnetic tape. In this case, since the two coils 504 and 514 are so connected that the winding directions of the two coils 504 and 514 act so as to add the magnetic flux circulating through the head members 501 and 511, the combined head is actuated as a head having a gap width of (39+19=58) μm, as described above. The adhesive layer portion of α μm at the adhered surface between the two head members does not cause any problems.

Then, in the standard speed reproduction, the switches 412a and 412b are still open. The switches 416a and 416b are turned over to connect one terminal of each of the head members 511 and 611 to ground, and the switches 416c and 416d are open at the same time. Further, the switches 417a and 417b are simultaneously open, and the switch 417c is closed. In this mode, the operation is carried out in the same manner as the triple speed reproduction described above, and the combined head is actuated as a head having a gap width of 58 μm in the same manner as the standard speed recording.

As described above, generally, a driver device of the present invention drives combined heads mounted on the peripheral surface of a rotary drum. Each combined head includes at least two head members contacted with one another for magnetic recording and reproduction, each head member including a winding coil and a gap having a gap width. Each combined head is formed with a continuous gap composed of the gaps of the head members, and the gap width of the continuous gap of the combined head is composed of the gap widths of the head members. By selectively short-circuiting at least one of the winding coils of the head members of the combined head by an electronic switch device, the effective gap width of the combined head can be changed. The head members with winding coils that are not short-circuited contribute to the formation of the effective gap width of the combined head and thus to the recording or reproducing of the image or data onto or off the magnetic tape.

Usually, in a magnetic recording and reproduction apparatus such as a VTR, by using a rotary transformer, circuits rotating together with a rotary drum and circuits arranged outside the rotary drum can be electrically connected. In the present driver device, switches for short-circuiting the winding coils of the head members are arranged within the rotary drum, and output signals of the combined heads are amplified within the rotary drum. The amplified output signals are output to the outside of the rotary drum through the rotary transformer. In this case, even when obstructive signals such as noise are added to the rotary transformer, the influences can be ignored and so improve the S/N ratio.

According to the present invention, as described above, the number of the heads arranged on the rotary drum 401 is reduced to half, and as shown in FIG. 1, when one combined head 500e is contacted with the running magnetic tape 402, the other combined head 500f does not contact with the magnetic tape 402 and thus prevents tape beating. Further, since there is only one gap portion, the stuffing and smudging can be largely reduced, and the contact between the gap portion and the magnetic tape becomes uniform and stable. Hence, the slide contact noise is largely reduced to enable the reduction of any jitter.

In particular, in the triple speed mode reproduction, since the winding coils of the head members having the gap width of 39 μm are directly short-circuited by the electronic switches mounted within the drum, the reluctance of the short-circuited head members is high, and no leakage of the magnetic flux from the head members having the gap width of 39 μm to the head members having the gap width of 19 μm is caused which prevents the generation of crosstalk components.

Further, since the number of the combined heads is reduced to half, the processing of the drum for mounting the heads and the mounting operation of the heads are also reduced to half. Since the electronic switches (analog switches are possible) are provided within the rotary drum, electric power is to be supplied within the rotary drum. However, since the electronic switches can be composed of MOS ICs of a low power consumption type, a power supply system by electromagnetic coupling of the rotary transformer 415 is possible.

In the driver device of the combined heads of the present invention, the number of the combined heads is reduced, and the standard and triple speed modes and the recording and reproducing modes can be changed by switches. Hence, the structure of the driver device can be simplified and manufactured at a low cost.

In the above-described embodiment, although the two head members having the gap widths of 39 μm and 19 μm are contacted with each other, the gap widths can not be restricted to these values and can, of course, be changed.

Further, at least three head members can be contacted with one another to prepare a combined head, and at least three kinds of gap widths for the standard and triple speed recording and reproduction modes and a particular reproduction mode can be determined.

Further, the position of the winding coil can be changed to any position of the head chip as long as the magnetic flux is circulated in a closed loop. When head chips composed of two ferrite cores or the like are adhered on the basis of the gap positions, the head chips can be contacted with each other by a sputtering method without using an adhesive.

Also, even when an adhesive layer with a thickness of several μm is formed in the adhesion operation of the two head chips, the head width (corresponding to 39 μm) of a supplemented head member can be reduced by that amount.

The switching circuits shown in FIG. 8 are only examples and thus the switching circuits are not restricted to these circuits. In any case, in the standard mode operation, the winding coil direction and the driving current are determined so that the magnetic flux of one head member such as a supplemental head member may be added to that of the other head member. On the other hand, in the triple speed mode operation, only one head member such as a head member having a narrow width is actuated and the other head member such as an unoperated head member is short-circuited to reduce the crosstalk generated by the unoperated head member in the same manner as described above with the same effects.

As described above, according to the present invention, since at least two head members having different gap widths are contacted with each other so that their gap portions may be aligned to obtain a combined head, by actuating one or at least two head members of the combined head depending on the mode of operation, the combined head can be changed to a suitable head width to remove crosstalk components of an adjacent track of a magnetic tape, enabling recording and reproduction operations with an excellent S/N ratio. Further, the number of the heads can be reduced to at most half as compared with a conventional combined head system, and hence the tape beating by an unoperated head or heads will not be caused.

Also, there is only one gap portion, and thus the contact condition between the gap portion and the running tape can readily be kept uniform and stable in order to reduce the slide contact noise to half and to obtain high quality images with less jitter in the recording and reproducing modes. Particularly, when the combined head is operated as a head having a narrow gap width, since the winding coil of the unoperated head member mechanically contacting and sliding with the magnetic tape is short-circuited within the rotary drum, the short-circuited head member has a large reluctance to enable the reduction of the crosstalk signals to half.

Further, the gains of the reproduction head amplifiers positioned within the rotary drum can be calculated in consideration of the balance with reference to the reproduction signal amplifiers of the rear stage and can thus be designed without consideration of the S/N ratio. Further, the winding coil grooves of the rotary transformer are reduced to half, and in addition to the reduction of the cost as the rotary transformer is arranged within the limited rotary drum, the designing surplus can be taken in the combined inductance, the leakage inductance and the combine factor to enable a signal transmittance with an excellent S/N ratio.

As described above, in the present invention, by the head structure, the change in the coil winding system within the rotary drum and the reduction of the winding coil grooves of the rotary transformer, the signal quality of the high quality VTR can be largely improved.

Although the present invention has been described in the preferred embodiments with reference to the accompanying drawings, it it readily understood that the present invention is not restricted to the preferred embodiments and that various changes and modifications can be made by those skilled in the art without departing from the spirit and scope of the present invention.

What is claimed is:

1. A driver device of a recording/reproducing apparatus for at least one magnetic combined head mounted on a peripheral surface of a rotary drum, the combined head having an effective gap width, plural head members and at least two winding coils for enabling the plural head members for recording and reproducing, the driver device comprising:

switch means, connected to the winding coils, for changing the effective gap width by selectively short-circuiting at least one of the winding coils, the effective gap width of the combined head having a first effective gap width for recording and reproducing in an n time speed mode when said switch means is closed and a second effective gap width for recording and reproducing in a standard speed mode when said switch means is open, n being an integer greater than 1; and controller means, operatively coupled to said switch means, for closing said switch means during n time speed mode recording and reproducing and for opening said switch means during standard speed mode recording and reproducing.

2. The driver device of claim 1, further comprising:

second switch means, coupled to the combined head, including at least two switches having first and second connection states for selecting a recording mode when said at least two switches are in the first connection state to supply a record video signal to the combined head and a reproducing mode when said at least two switches are in the second connection state to reproduce a reproduction video signal from the combined head, said controller means being operatively coupled to said at least two switches to switch said at least two switches to the first connection state during the recording mode and the second connection state during the reproducing mode.

3. The driver device of claim 1, further comprising:

video record amplifier means, mounted within the recording/reproducing apparatus adjacent the rotary drum, for amplifying a record video signal;

'record head amplifier means, mounted upon the rotary drum, for further amplifying the record video signal amplified by said video record amplifier means to output an amplified record video signal to the combined head;

reproduction head amplifier means, mounted upon the rotary drum, for amplifying a reproduction video signal reproduced by the combined head;

reproduction signal amplifier means, mounted within the recording/reproducing apparatus adjacent the rotary drum, for further amplifying the reproduction video signal amplified by said reproduction head amplifier means to output an amplified reproduction video signal;

rotary transformer means for electrically connecting said record head amplifier means with said video record amplifier means during a recording mode and said reproduction head amplifier means with said reproduction signal amplifier means during a reproducing mode when the rotary drum is rotating; and second switch means including
- a first switch mounted within the recording/reproducing apparatus adjacent the rotary drum between system ground and a connection point of said video record amplifier means with said rotary transformer means,
- a second switch mounted within the recording/reproducing apparatus adjacent the rotary drum between the system ground and a connection point of said reproduction signal amplifier means with said rotary transformer means,
- a third switch mounted upon the rotary drum between said record head amplifier means and said rotary transformer means, and
- a fourth switch mounted upon the rotary drum for selectively connecting the system ground to a connection point of said reproduction head amplifier means with the combined head and to a connection point of said record head amplifier means with the combined head,
- said controller means controlling said second switch means so that during the recording mode said first switch is open, said second and third switches are closed, and said fourth switch connects the system ground to the connection point of said reproduction head amplifier means with the combined head and so that during the reproducing mode said first switch is closed, said second and third switches are open, and said fourth switch connects the system ground to the connection point of said record head amplifier means with the combined head.

4. A driver device of a recording/reproducing apparatus for driving at least two magnetic combined heads mounted on a peripheral surface of a rotary drum, each combined head having an effective gap width, plural head members and at least two winding coils for enabling the plural head members for recording and reproducing, the driver device comprising:

- at least two switch means, each being connected to the winding coils of a respective one of the combined heads, for changing the effective gap width of the respective combined head by selectively short-circuiting at least one of the winding coils of the respective combined head, the effective gap width of the respective combined head having a first effective gap width for recording and reproducing in an n time speed mode when a respective switch means is closed and a second effective gap width for recording and reproducing in a standard speed mode when the respective switch means is open, n being an integer greater than 1; and
- controller means, operatively coupled to said at least two switch means, for closing said at least two switch means during n time speed mode recording and reproducing and for opening said at least two switch means during standard speed mode recording and reproducing.

5. A method of driving a magnetic head mounted upon a rotary drums of a recording/reproducing apparatus, the magnetic head having plural head members, each of the plural head members having a respective head gap and a winding coil wrapped thereon for enabling the respective head gap for recording and reproducing, the plural head members being bonded together to form a composite head gap, the method comprising the steps of:

- enabling all of the respective winding coils of the plural head members of the magnetic head during recording and reproducing in a standard speed mode; and
- short-circuiting one of the respective winding coils of the plural head members of the magnetic head and enabling the remaining respective winding coils of the plural head members of the magnetic head during recording and reproducing in an n time speed mode, wherein n is an integer greater than 1.

6. The method of claim 5, wherein said step of short-circuiting one of the respective winding coils comprises closing a switch coupled across the respective winding coil.

* * * * *